United States Patent
Sato et al.

(10) Patent No.: US 12,098,951 B2
(45) Date of Patent: Sep. 24, 2024

(54) HYPERSPECTRAL SENSOR AND HYPERSPECTRAL CAMERA

(71) Applicant: FUJIFILM Corporation, Tokyo (JP)

(72) Inventors: Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 193 days.

(21) Appl. No.: 17/849,286

(22) Filed: Jun. 24, 2022

(65) Prior Publication Data

US 2022/0333987 A1 Oct. 20, 2022

Related U.S. Application Data

(63) Continuation of application No. PCT/JP2020/048920, filed on Dec. 25, 2020.

(30) Foreign Application Priority Data

Dec. 27, 2019 (JP) .................................. 2019-238468

(51) Int. Cl.
*G01J 3/18* (2006.01)
*G01J 3/02* (2006.01)
(Continued)

(52) U.S. Cl.
CPC ............... *G01J 3/18* (2013.01); *G01J 3/0208* (2013.01); *G01J 3/502* (2013.01); *G02B 5/1814* (2013.01);
(Continued)

(58) Field of Classification Search
CPC ....... G01J 2003/2826; G01J 2003/2823; G01J 2003/1861; G01J 3/18; G02B 5/3016
See application file for complete search history.

(56) References Cited

U.S. PATENT DOCUMENTS

2006/0072109 A1 4/2006 Bodkin et al.
2014/0055784 A1 2/2014 Kremer et al.
(Continued)

FOREIGN PATENT DOCUMENTS

JP 2015-75352 A 4/2015
JP 2017-504791 A 2/2017
WO WO 2019/111800 A1 6/2019

OTHER PUBLICATIONS

Michael J. Escuti, "Simplified Spectropolarimetry Using Reactive Mesogen Polarization Gratings", 2006 (Year: 2006).*
(Continued)

*Primary Examiner* — Maurice C Smith
(74) *Attorney, Agent, or Firm* — Birch, Stewart, Kolasch & Birch, LLP

(57) ABSTRACT

Provided are a hyperspectral sensor and a hyperspectral camera in which influence of external information such as a reflecting material is reduced such that the spectral data accuracy of a subject to be acquired can be improved. In the hyperspectral sensor in which light from a subject is split into light components in a plurality of wavelength ranges by a spectral optical element and each of the light components in the wavelength ranges is received by a sensor array consisting of a plurality of photodetection elements to acquire spectral data in which spectral information of the subject is associated with each of the photodetection elements, a polarization diffraction element that emits polarized light is used as the spectral optical element.

12 Claims, 8 Drawing Sheets

(51) Int. Cl.
  *G01J 3/50*    (2006.01)
  *G02B 5/18*    (2006.01)
  *G02B 5/30*    (2006.01)
  *G02B 27/30*   (2006.01)
  *G02B 27/42*   (2006.01)
  *G01J 3/12*    (2006.01)

(52) U.S. Cl.
  CPC ............ *G02B 5/3016* (2013.01); *G02B 27/30* (2013.01); *G02B 27/4294* (2013.01); *G01J 2003/1291* (2013.01); *G01J 2003/1861* (2013.01)

(56) References Cited

U.S. PATENT DOCUMENTS

| | | |
|---|---|---|
| 2015/0168210 A1 | 6/2015 | Dorschner |
| 2017/0373459 A1 | 12/2017 | Weng et al. |
| 2021/0190676 A1 | 6/2021 | Murayama et al. |

OTHER PUBLICATIONS

Nelma Gupta, "Fused Spectropolarimetric Visible Near-IR Imaging", 2003 (Year: 2003).*

Japanese Notice of Reasons for Refusal for corresponding Japanese Application No. 2021-567705, dated Apr. 11, 2023, with an English translation.

Japanese Decision of Refusal for corresponding Japanese Application No. 2021-567705, dated Aug. 15, 2023, with an English translation.

International Preliminary Report on Patentability and the Written Opinion of the International Searching Authority (Forms PCT/IB/326, PCT/IB/373 and PCT/ISA/237) for International Application No. PCT/JP2020/048920, dated Jul. 7, 2022, with an English translation.

International Search Report (Form PCT/ISA/210) for International Application No. PCT/JP2020/048920, dated Mar. 23, 2021, with English translation.

* cited by examiner

HYPERSPECTRAL SENSOR AND HYPERSPECTRAL CAMERA

CROSS-REFERENCE TO RELATED APPLICATIONS

This application is a Continuation of PCT International Application No. PCT/JP2020/048920 filed on Dec. 25, 2020, which claims priority under 35 U.S.C. § 119(a) to Japanese Patent Application No. 2019-238468 filed on Dec. 27, 2019. The above application is hereby expressly incorporated by reference, in its entirety, into the present application.

BACKGROUND OF THE INVENTION

1. Field of the Invention

The present invention relates to a hyperspectral sensor and hyperspectral camera that acquire spectral data of a subject.

2. Description of the Related Art

In the related art, as a device that acquires spectral data in which spectral information is associated with each of pixels forming a two-dimensional image of a subject, for example, a hyperspectral detection device described in JP2015-075352A is known (JP2015-075352A).

SUMMARY OF THE INVENTION

In the spectral detection device described in JP2015-075352A, light from a subject is split into light at each wavelength by a spectrophotometer.

Here, in a case where an image of a subject is acquired, accurate data cannot be obtained due to the influence of a color of ambient light. In JP2015-075352A, a spectrally continuous light source is used to solve this problem.

However, even in a case where this method is used, there is a problem in that the influence of external information cannot be completely prevented. For example, in a case where the rain falls such that a puddle is formed, it is difficult to obtain desired information in front of the puddle due to, for example, light reflected from the water surface.

The present invention has been made in order to solve the problem, and an object thereof is to provide a hyperspectral sensor and a hyperspectral camera in which influence of external information other than influence of a color of ambient light is reduced such that a subject is accurately visible.

In order to achieve the object, the present invention has the following configurations.

[1] A hyperspectral sensor in which light from a subject is split into light components in a plurality of wavelength ranges by a spectral optical element and each of the light components in the wavelength ranges is received by a sensor array consisting of a plurality of photodetection elements to acquire spectral data in which spectral information of the subject is associated with each of the photodetection elements,
  in which the spectral optical element is a polarization diffraction element that emits polarized light.
[2] The hyperspectral sensor according to [1],
  in which the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.
[3] The hyperspectral sensor according to [1] or [2],
  in which a light-collimating optical element that collimates transmitted light and causes the collimated light to be incident into the polarization diffraction element is provided.
[4] The hyperspectral sensor according to [3],
  in which the light-collimating optical element includes a slit.
[5] The hyperspectral sensor according to [3],
  in which the light-collimating optical element includes a unit in which a slit and a lens element are combined.
[6] The hyperspectral sensor according to [3],
  in which the light-collimating optical element includes a lens array.
[7] The hyperspectral sensor according to any one of [1] to [6],
  in which a retardation layer is provided on a side of the spectral optical element opposite to a side where the sensor array is provided.
[8] The hyperspectral sensor according to [7],
  in which the retardation layer is a ¼ wave plate.
[9] The hyperspectral sensor according to any one of [1] to [8],
  in which a focus optical element is provided between the spectral optical element and the sensor array.
[10] The hyperspectral sensor according to any one of [2] to [9],
  in which the liquid crystal polarization diffraction element has a region where the direction of the optical axis of the liquid crystal compound is twisted and rotates in a thickness direction.
[11] The hyperspectral sensor according to any one of [2] to [10],
  in which a plurality of the liquid crystal diffraction elements are provided, and
  in at least two of the liquid crystal diffraction elements, a region where the direction of the optical axis of the liquid crystal compound is twisted and rotates in a thickness direction is provided and directions that are twisted and rotate in the thickness direction are different from each other.
[12] The hyperspectral sensor according to any one of [2] to [11],
  in which in a cross sectional image obtained by cutting the liquid crystal diffraction element in a thickness direction along the one in-plane direction and observing the cross section with a scanning electron microscope, a plurality of pairs of bright lines and dark lines derived from a direction of the optical axis are present along the one in-plane direction and a region where the pairs of the bright lines and the dark lines are tilted with respect to a normal line of an interface of the liquid crystal diffraction element is provided.
[13] The hyperspectral sensor according to [12],
  in which a plurality of the liquid crystal diffraction elements are provided, and
  in the cross sectional images of at least two of the liquid crystal diffraction elements, in a region where at least portions of the two liquid crystal diffraction elements face each other, a direction in which the pairs of the bright lines and the dark lines are tilted with respect to the normal line in one liquid crystal diffraction element is different from a direction in which the pairs of the bright lines and the dark lines are tilted with respect to the normal line in another liquid crystal diffraction element.

[14] A hyperspectral camera comprising:
the hyperspectral sensor according to any one of [1] to [13],
in which spectral data forming a two-dimensional image of the subject is acquired.

According to an aspect of the present invention, a hyperspectral sensor and a hyperspectral camera in which disturbance such as reflection can be removed can be realized.

DESCRIPTION OF THE PREFERRED EMBODIMENTS

Hereinafter, a hyperspectral sensor and a hyperspectral camera according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In addition, although not limited thereto, in invisible light, an ultraviolet ray (ultraviolet light) refers to light in a wavelength range of 200 nm or longer and shorter than 380 nm, and an infrared ray (infrared light) refers to light in a wavelength range of longer than 780 nm and 12000 nm or shorter.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$ using AxoScan (manufactured by Axometrics, Inc.). By inputting an average refractive index $((nx+ny+nz)/3)$ and a thickness $(d\ (\lambda m))$ to AxoScan, the following expressions can be calculated.

Slow Axis Direction (°)
$Re(\lambda)=R0(\lambda)$
$R0(\lambda)$ is expressed as a numerical value calculated by AxoScan and represents $Re(\lambda)$.

(Hyperspectral Sensor and Hyperspectral Camera)
[Spectral Detection Device]

Figure 1:
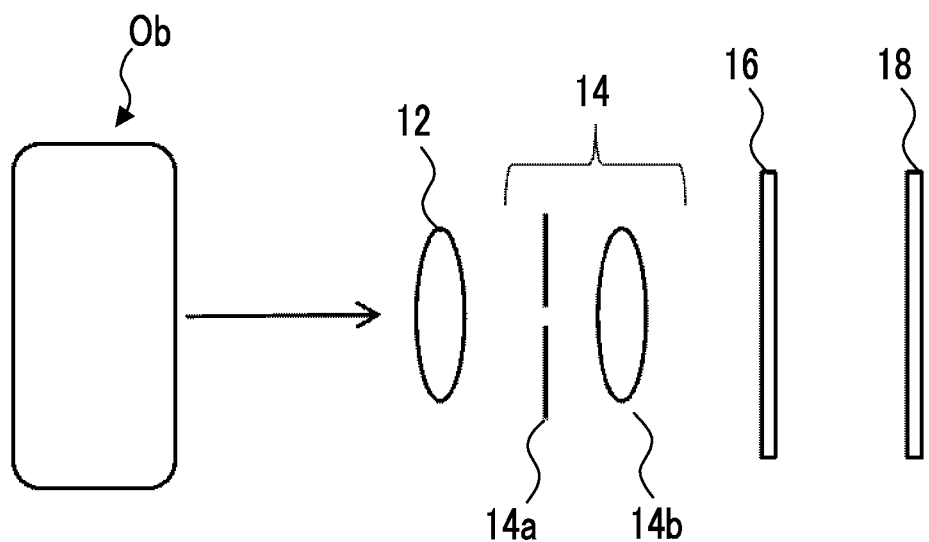
FIG. 1 is a diagram conceptually showing an example of a spectral detection device according to the present invention.

FIG. 1 conceptually shows an example of the spectral detection device (hyperspectral sensor) according to the embodiment including the optical member according to the embodiment of the present invention.

The spectral detection device 10 shown in FIG. 1 includes a light-propagating optical element 12, a light-collimating optical element 14, a spectral optical element 16, and a sensor array 18 in this order.

The light-propagating optical element 12 causes light from a subject Ob to propagate to a direction of the light-collimating optical element 14, the spectral optical element 16, that is, the polarization diffraction element, and the sensor array 18.

The light-collimating optical element 14 has a function of collimating light from the subject Ob into light having a parallel linear shape (or a point-like shape) to allow transmission thereof. The light-collimating optical element 14 collimates transmitted light such that the collimated light is incident into the spectral optical element 16.

The spectral optical element 16 is formed of the polarization diffraction element and diffracts light from the subject Ob to split the light into light components in a plurality of wavelength ranges. In addition, the polarization diffraction element emits the polarized diffracted light. The diffraction angle by the polarization diffraction element varies depending on wavelengths. Specifically, as the wavelength of light increases, the diffraction angle increases. Therefore, the light diffracted by the polarization diffraction element is linearly split in one direction in which the light is diffracted (refer to FIG. 10).

In addition, the polarization diffraction element diffracts polarized light components perpendicular to each other in opposite directions. The polarized light components perpendicular to each other are right circularly polarized light and left circularly polarized light or are linearly polarized light components perpendicular to each other. That is, the polarization diffraction element diffracts, for example, right circularly polarized light and left circularly polarized light having the same wavelength in opposite directions at the same diffraction angle (refer to FIG. 10).

The spectral optical element 16 is disposed such that the direction in which the light diffracted by the polarization diffraction element is split is substantially perpendicular to the direction in which the light-collimating optical element 14 collimates the light.

In the sensor array 18, a plurality of photodetection elements are disposed in two dimensions. The photodetection element photoelectrically converts received light into an electrical signal according to the light amount to output the electrical signal.

In the sensor array 18, each of the photodetection elements arranged in the splitting direction of the spectral optical element 16 receives each of the light components in the wavelengths split by the spectral optical element 16 to acquire the intensity at each of the wavelengths, that is, spectral data.

Figure 10:
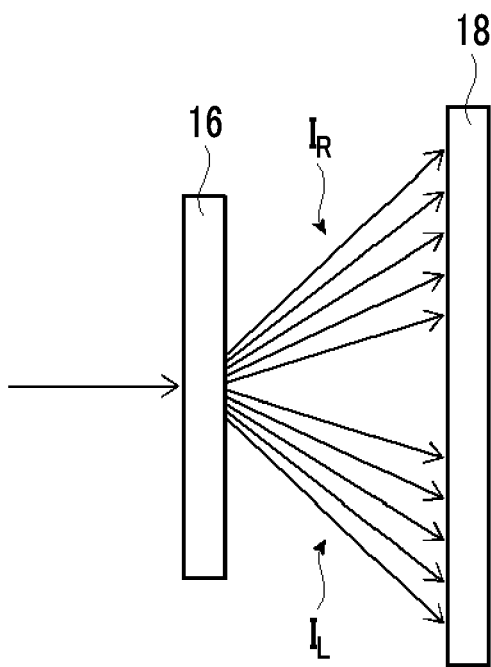
FIG. 10 is a diagram showing an action of the spectral detection device according to the present invention.

In the spectral detection device 10 according to the embodiment of the present invention, as shown in FIG. 1, light from the subject Ob propagates in the light-propagating optical element 12, is collimated into light having a parallel linear shape (or a point-like shape) by the light-collimating optical element 14, and transmits through the light-collimating optical element 14. The transmitted light is incident into the polarization diffraction element as the spectral optical element 16 to be diffracted and split in different directions depending on wavelengths. Each of the split light components in the wavelength ranges is received by the sensor array 18 to detect the spectral data of the subject Ob. In addition, in the polarization diffraction element used in the spectral detection device 10 according to the embodiment of the present invention diffracts light incident into the polarization diffraction element in different directions depending on the polarized state of the incident light. For example, in the spectral detection device 10 according to the embodiment of the present invention shown in FIG. 1, In a case where light components having different polarized states are incident into the polarization diffraction element as the spectral optical element 16, as shown in FIG. 10, the light components transmitted through the polarization diffraction element, for example, right circularly polarized light $I_R$ and left circularly polarized light $I_L$ are diffracted in different directions such that different polarized light components are received by an upper half and a lower half of the sensor array 18. Accordingly, in the sensor array 18, the spectral data corresponding to the polarized state of light from the subject Ob can be detected at different positions in a plane of the sensor array 18.

As described above, in a spectral detection device in the related art, in a case where spectral data of a subject is acquired and a reflecting surface such as a water surface or glass is present in the ambient environment, there is a problem in that appropriate spectral data of the subject cannot be obtained due to light reflected from the reflecting surface.

Here, as is well known, in the light reflected from the reflecting surface such as the water surface or glass, the polarized state changes, for example, the amount of a specific polarized light component increases.

Therefore, as described above, the spectral detection device 10 according to the embodiment of the present invention includes the polarization diffraction element as the spectral optical element 16 and diffracts light components having different polarized states in different directions. As a result, spectral data of a specific polarized light component that is included in the reflected light in a large amount and spectral data of another polarized light component can be distinguished from each other.

As a result, in the spectral detection device 10 according to the embodiment of the present invention, for example, the amount of disturbance such as light reflected from a water surface of a puddle or light reflected from a surface of glass can be reduced, and information of a subject (a desired object) in front of the puddle, the glass, or the like can be obtained.

<Light-Propagating Optical Element>

As the light-propagating optical element 12, any well-known element can be used as long as it has the same function.

The light-propagating optical element 12 is an optical element that causes light from the subject to propagate in a direction of the spectral optical element 16, that is, the polarization diffraction element, the light-collimating optical element 14, and the sensor array 18 and changes (bends) a traveling direction of at least a part of light incident into the optical element. The light-propagating optical element 12 is not particularly limited. For example, various optical elements such as a lens element, a prism element, or a spatial light modulation element can be used depending on purposes.

Another optical element may be disposed on the sensor array side of the light-propagating optical element 12 to change a light traveling direction such that the light propagates in a direction of the spectral optical element, the light-collimating optical element, and the sensor array.

<Light-Collimating Optical Element>

As the light-collimating optical element 14, any well-known element can be used as long as it has the same function.

The light-collimating optical element 14 has a function of collimating light from the subject into light having a parallel linear shape (or a point-like shape) to allow transmission thereof. The light-collimating optical element 14 is not particularly limited. For example, a slit can be used. The slit member may be a member having a linear (or point-like) and spatial gap in a plane or may be a member in which light is transmitted and blocked by liquid crystal depending on application of a voltage such that a slit is formed and the position of the slit moves electrically. In addition, a lens element (lens array) can also be used. Light from a subject is collimated in a parallel linear shape (or a point-like shape) by the lens element and transmits through the lens element such that the same function can be exhibited. A plurality of elements having a light-collimating function may be disposed in a plane to be used as the light-collimating optical element 14. In addition, light transmitted through the element such as the slit may be collimated into parallel light by another optical element such that this combination is used as the light-collimating optical element 14. In the example shown in FIG. 1, the light-collimating optical element 14 includes a slit member 14a and a lens element 14b. The slit member 14a includes a gap (slit) that extends in a direction perpendicular to the paper plane of FIG. 1, in which incident light transmits through the slit as linear light that extends in the direction perpendicular to the paper plane of FIG. 1.

<Spectrophotometer (Spectral Optical Element)>

The spectrophotometer splits light from a subject into light components in a plurality of wavelength ranges. The spectrophotometer is provided with the spectral optical element 16, and this spectral optical element 16 splits, for example, light in a wavelength range of visible light to near infrared light into light components in a plurality of wavelength ranges (bands). As the spectral optical element 16 according to the embodiment of the present invention, the polarization diffraction element is preferably used.

[Polarization Diffraction Element]

As the polarization diffraction element, a well-known polarization diffraction element can be used. The polarization diffraction element is a diffraction element that controls a diffraction direction or a polarized state of emitted light and a diffracted light intensity depending on the polarized state of incident light by controlling the polarized state in a fine region. Examples of the polarization diffraction element include a polarization diffraction element in which a diffraction structure is formed using structural birefringence described in "Erez Hasman et al., Polarization dependent focusing lens by use of quantized Pancharatnm-Berry phase diffractive optics, Applied Physics Letters, Volume 82, Number 3, pp. 328-330" and a polarization diffraction element in which a diffraction structure is formed using a birefringence material described in JP5276847B.

Examples of the polarization diffraction element include a liquid crystal diffraction element that is formed using a composition including a liquid crystal compound and has a liquid crystal alignment pattern in which a direction of an optical axis derived from the liquid crystal compound changes while continuously rotating in at least one in-plane direction. In addition, it is also preferable that the liquid crystal diffraction element includes a cholesteric liquid crystal layer obtained by immobilizing a cholesteric liquid crystalline phase.

<<Liquid Crystal Diffraction Element>>

An example of the liquid crystal diffraction element will be described using FIGS. 2 to 5.

Figure 2:
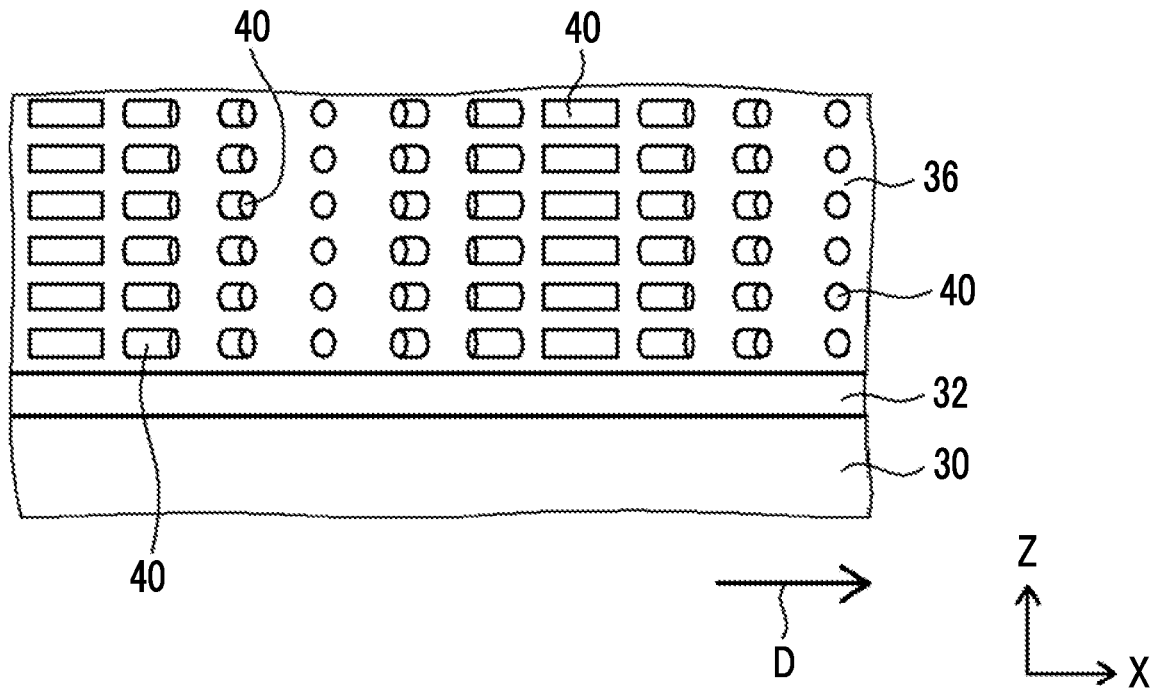
FIG. 2 is a diagram conceptually showing an example of a liquid crystal layer used in a diffraction element.
Figure 3:
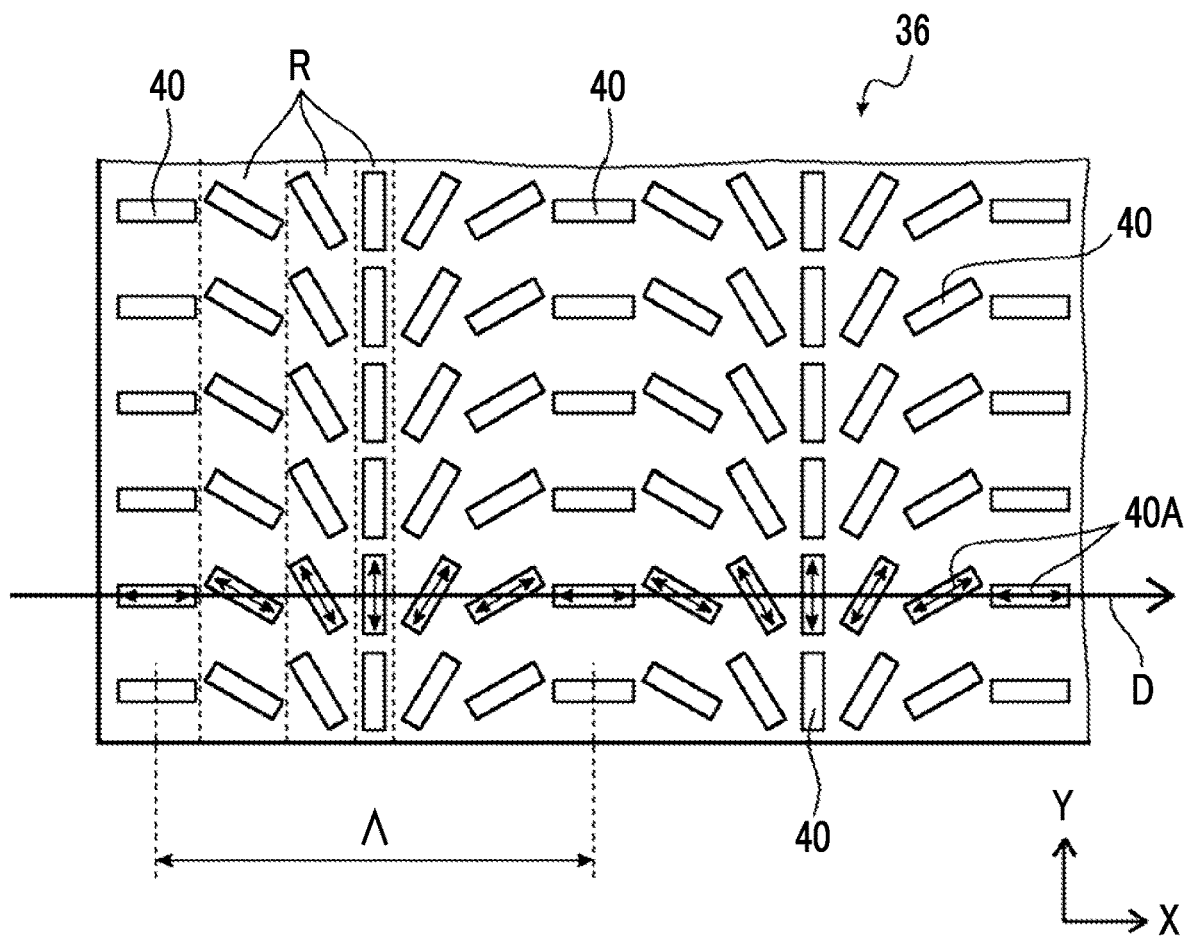
FIG. 3 is a plan view showing the liquid crystal layer shown in FIG. 2.

FIG. 3 is a schematic diagram showing an alignment state of a liquid crystal compound in a plane of a main surface of a liquid crystal layer 36 including the liquid crystal diffraction element. In addition, FIG. 2 is a schematic cross-sectional view showing a state of a liquid crystal phase in a cross section perpendicular to the main surface. In the following description, it is assumed that a main surface of the liquid crystal layer 36 is an X-Y plane and a cross section perpendicular to the X-Y plane is a X-Z plane. That is, FIG. 3 corresponds to a schematic diagram of the X-Y plane of the liquid crystal layer 36, and FIG. 2 corresponds to a schematic diagram of the X-Z plane of the liquid crystal layer 36.

In the example shown in FIG. 2, the liquid crystal diffraction element includes the support 30, the alignment film 32, and the liquid crystal layer 36.

In the example shown in FIG. 2, the liquid crystal diffraction element includes the support 30, the alignment film 32, and the liquid crystal layer 36. However, the present invention is not limited to this configuration. The liquid crystal diffraction element may include only the alignment film 32 and the liquid crystal layer 36 by peeling off the support 30 after bonding the laminate to the another substrate. Alternatively, the liquid crystal diffraction element may include only the liquid crystal layer 36 by peeling off the support 30 and the alignment film 32 after bonding the laminate to another substrate.

(Support)

The support 30 supports the alignment film 32 and the liquid crystal layer 36.

As the support 30, various sheet-shaped materials (films or plate-shaped materials) can be used as long as they can support the alignment film 32 and the liquid crystal layer 36.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the liquid crystal layer 36 can be supported.

The thickness of the support 30 is preferably 1 to 2000 μm, more preferably 3 to 500 μm, and still more preferably 5 to 250 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

(Alignment Film)

In the liquid crystal diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 36.

Although described below, in the present invention, the liquid crystal layer 36 has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the liquid crystal layer 36 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the liquid crystal diffraction element, for example, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 6:
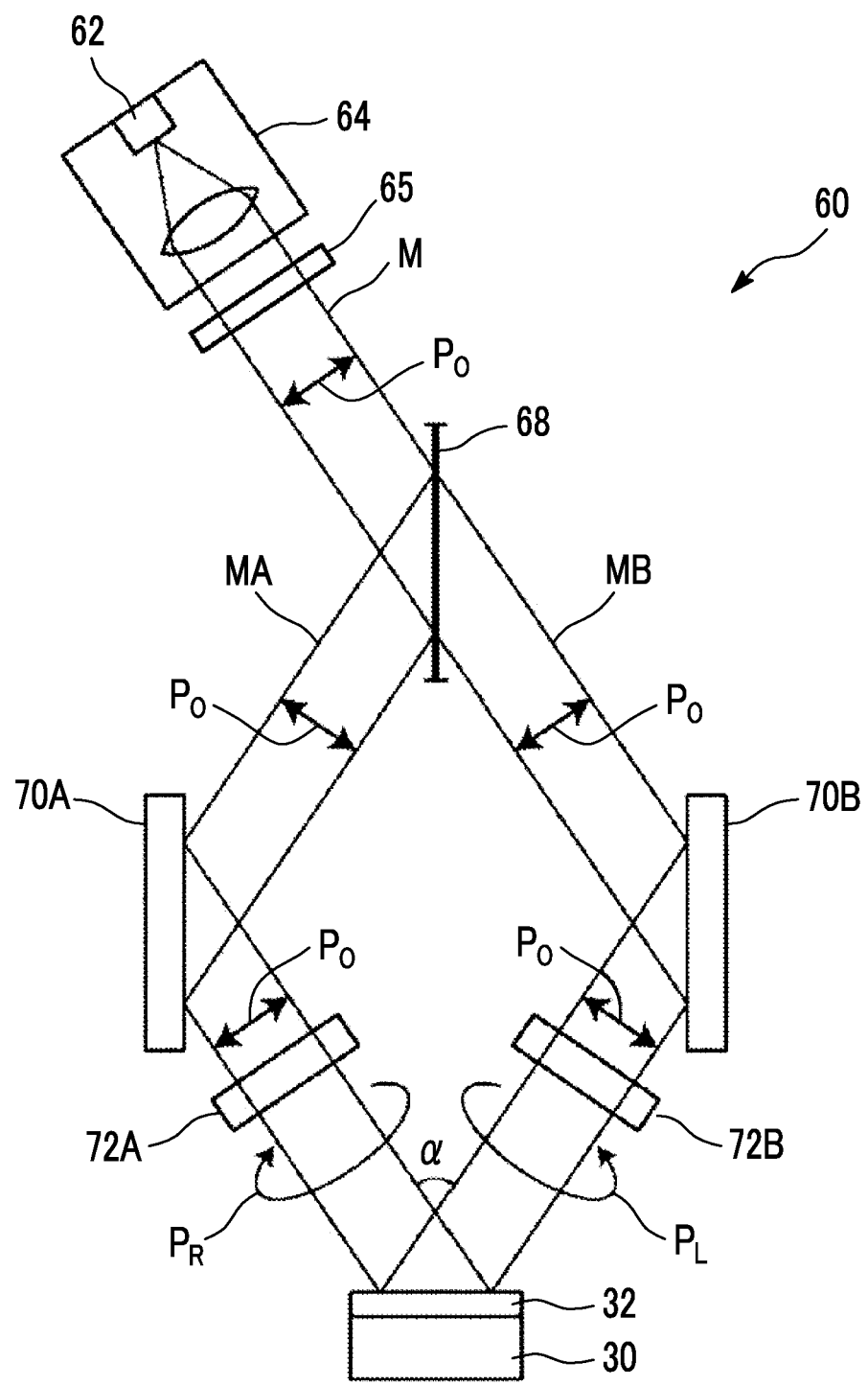
FIG. 6 is a conceptual diagram showing an example of an exposure device that exposes an alignment film.

FIG. 6 conceptually shows an example of an exposure device that exposes the alignment film 32 to form an alignment pattern.

An exposure device 60 shown in FIG. 6 includes: a light source 64 including a laser 62; an μ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarized state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 36 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

(Liquid Crystal Layer)

In the liquid crystal diffraction element, the liquid crystal layer 36 is formed on a surface of the alignment film 32.

As described above, various liquid crystal diffraction elements can be used as the liquid crystal layer used in the present invention as long as they have the liquid crystal alignment pattern in which the optical axis 40A derived from the liquid crystal compound 40 continuously rotates in at least one in-plane direction.

FIGS. 2 and 3 show an example of the liquid crystal diffraction element.

A liquid crystal diffraction element shown in FIGS. 2 and 3 includes the support 30, the alignment film 32, and a liquid crystal layer 36.

The liquid crystal layer 36 of the liquid crystal diffraction element shown in FIG. 3 also has the liquid crystal alignment pattern in which the optical axis 40A of the liquid crystal compound 40 continuously rotates in the arrangement axis D direction. FIG. 3 shows only the liquid crystal compound of the surface of the alignment film 32 side.

As described above, the liquid crystal layer 36 has the liquid crystal alignment pattern in which the direction of the optical axis 40A derived from the liquid crystal compound 40 changes while continuously rotating in the arrangement axis D direction in a plane, that is, in the one in-plane direction indicated by arrow D.

In the example shown in the drawing, the liquid crystal compound 40 has the liquid crystal alignment pattern in which the optical axis 40A of the liquid crystal compound 40 changes while continuously rotating clockwise in the arrangement axis D direction.

The liquid crystal compound 40 forming the liquid crystal layer 36 is two-dimensionally arranged in a direction perpendicular to the arrangement axis D and the one in-plane direction (arrangement axis D direction).

In the following description, the direction perpendicular to the arrangement axis D direction will be referred to as "Y direction" for convenience of description. That is, the arrow Y direction is a direction perpendicular to the one in-plane direction in which the direction of the optical axis 40A of the liquid crystal compound 40 changes while continuously rotating in a plane of the liquid crystal layer. Accordingly, in FIG. 2 and FIGS. 4 and 5 described below, the Y direction is a direction perpendicular to the paper plane.

Specifically, "the direction of the optical axis 40A of the liquid crystal compound 40 changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than b 15°.

In addition, in the present invention, the liquid crystal compound rotates in the direction in which an angle between the optical axes 40A of the liquid crystal compounds 40 adjacent to each other in the arrangement axis D direction decreases. Accordingly, in the liquid crystal layer shown in FIGS. 2 and 3, the optical axis 40A of the liquid crystal compound 40 rotates to the right (clockwise) in the direction indicated by the arrow of the arrangement axis D.

On the other hand, regarding the liquid crystal compound 40 forming the liquid crystal layer 36, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In the liquid crystal layer 36, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 36, the single period Λ is repeated in the arrangement axis D direction, that is, in the one in-plane direction in which the direction of the optical axis 40A changes while continuously rotating.

In a case where circularly polarized light is incident into the above-described liquid crystal layer 36, the light is refracted such that the direction of the circularly polarized light is converted.

Figure 4:
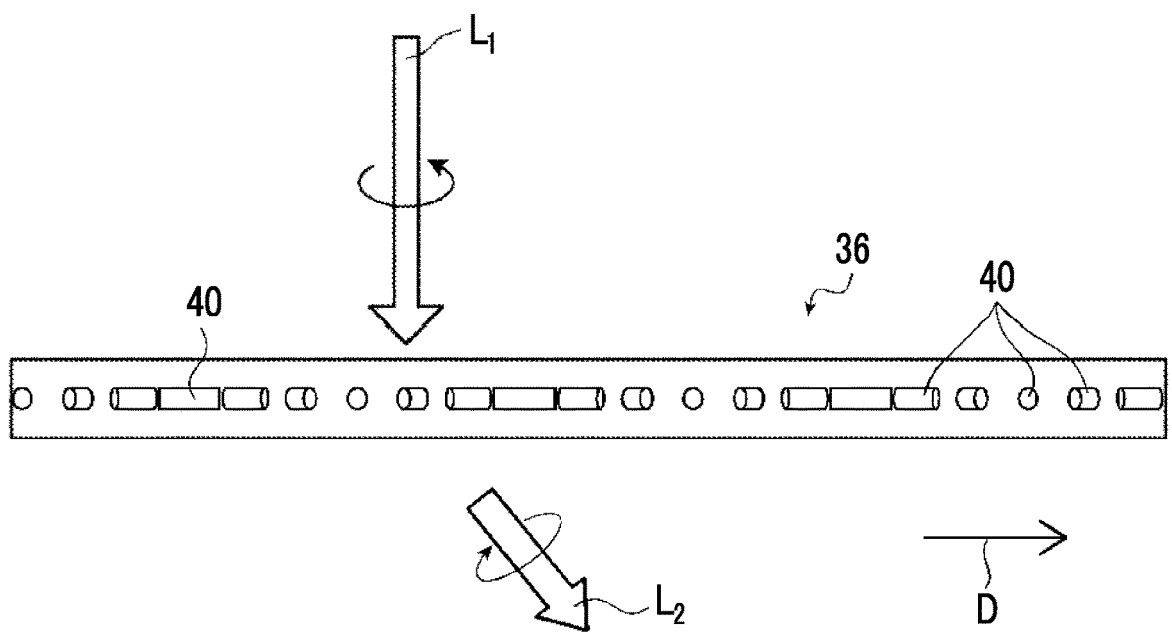
FIG. 4 is a conceptual diagram showing an action of the liquid crystal layer shown in FIG. 2.
Figure 5:
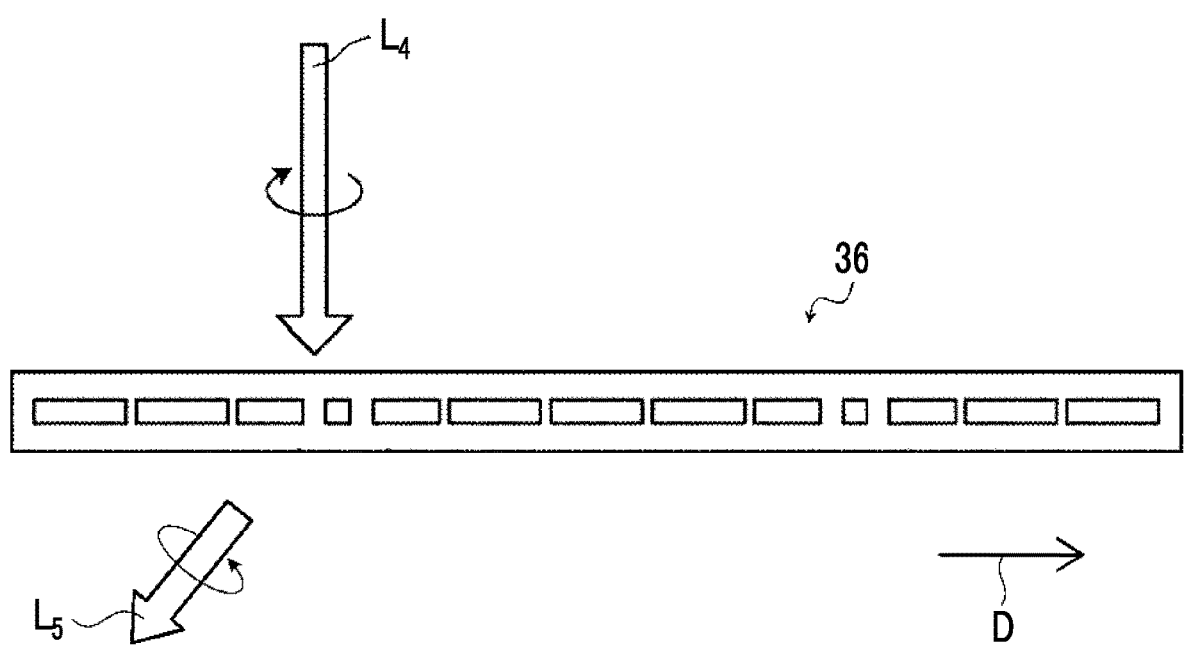
FIG. 5 is a conceptual diagram showing the action of the liquid crystal layer shown in FIG. 2.

This action is conceptually shown in FIGS. 4 and 5. In the liquid crystal layer 36, the value of the product of the difference in refractive index of the liquid crystal compound and the thickness of the optically-anisotropic layer is λ/2.

As shown in FIG. 4, in a case where the value of the product of the difference in refractive index of the liquid crystal compound in the liquid crystal layer 36 and the thickness of the optically-anisotropic layer is λ/2 and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 5, in a case where the value of the product of the difference in refractive index of the liquid crystal compound in the liquid crystal layer 36 and the thickness of the optically-anisotropic layer is λ/2 and incidence light $L_4$ of right circularly polarized light is incident into the liquid crystal layer 36, the incidence light $L_4$ transmits through the liquid crystal layer 36 to be imparted with a phase difference of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

By changing the single period Λ of the liquid crystal alignment pattern formed in the liquid crystal layer 36, refraction angles of the transmitted light components $L_2$ and $L_5$ can be adjusted. Specifically, in the liquid crystal layer 36, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 2 to 5, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates. By using the liquid crystal diffraction element having the region where the liquid crystal compound is twisted and rotates, a high diffraction efficiency can be obtained in a wide wavelength range.

<<Method of Forming Liquid Crystal Layer>>

The liquid crystal layer can be formed by immobilizing a liquid crystal phase, the liquid crystal phase obtained by aligning a liquid crystal compound in a predetermined alignment state.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

——Polymerizable Liquid Crystal Compound——

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-

16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

——Surfactant——

The liquid crystal composition used for forming the liquid crystal layer may include a surfactant.

It is preferable that the surfactant is a compound that can function as an alignment control agent contributing to the stable or rapid alignment of a liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a twisted alignment of a cholesteric liquid crystalline phase to be formed. The chiral agent may be selected depending on the purpose because a twisted direction or a twist amount derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystalline phase, and curing the liquid crystal compound.

That is, in a case where the liquid crystal layer is formed on the alignment film 32, it is preferable that the liquid crystal layer obtained by immobilizing a liquid crystalline phase is formed by applying the liquid crystal composition to the alignment film 32, aligning the liquid crystal compound to a state of a liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer is not particularly limited, and the thickness with which a required light reflectivity can be obtained may be appropriately set depending on the use of the diffraction element, the diffraction efficiency required for the liquid crystal layer, the material for forming the liquid crystal layer, and the like.

Here, in the present invention, the liquid crystal diffraction element (liquid crystal layer) has a region where a direction of an optical axis of the liquid crystal compound is twisted and rotates in a thickness direction.

Figure 11:
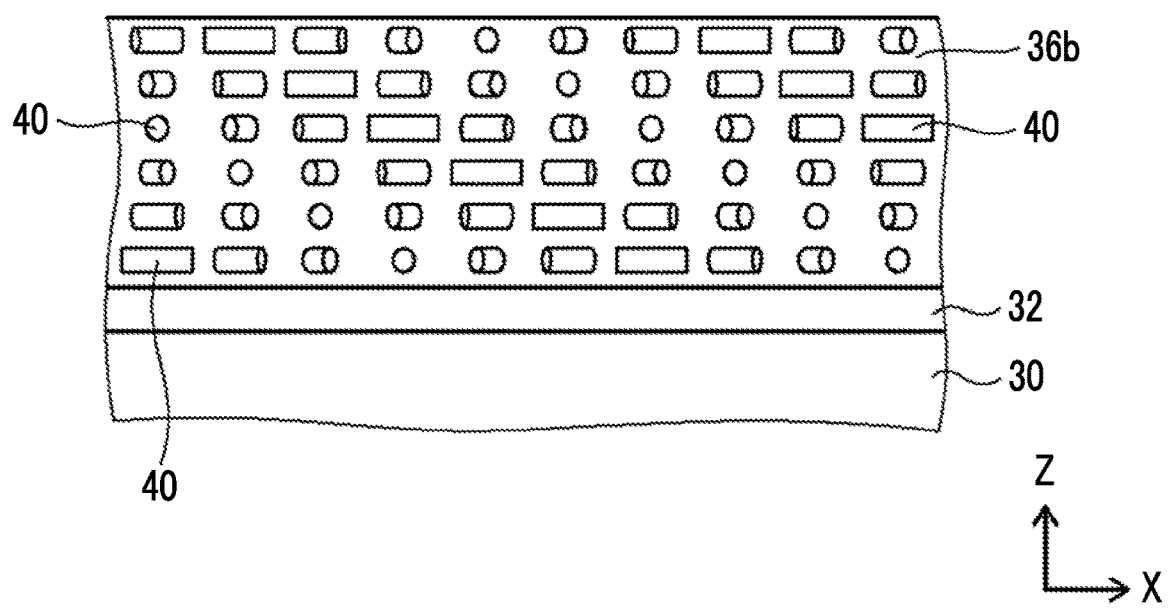
FIG. 11 is a diagram showing another example of a liquid crystal diffraction element in the spectral detection device according to the present invention.

FIG. 11 conceptually shows another example of the liquid crystal diffraction element (liquid crystal layer) in the hyperspectral sensor according to the embodiment of the present invention.

A liquid crystal layer 36b shown in FIG. 11 has the same configuration as the liquid crystal layer 36 shown in FIG. 2, except that the liquid crystal compound is twisted and aligned in the thickness direction. That is, in a case where the liquid crystal layer 36b shown in FIG. 11 is seen from the thickness direction, as in the example shown in FIG. 3, the liquid crystal layer 36b has a liquid crystal alignment pattern in which the direction of the optical axis 40A changes while continuously rotating along the arrangement axis D in a plane.

The liquid crystal layer 36b shown in FIG. 11 has a twisted structure in which the liquid crystal compound 40 is turned and laminated in the thickness direction, and a total rotation angle between the liquid crystal compound 40 present on one main surface side of the liquid crystal layer 36b and the liquid crystal compound 40 present on another main surface side of the liquid crystal layer 36b is less than 360°.

This way, in a case where the liquid crystal layer 36b has the structure in which the liquid crystal compound is twisted and aligned in the thickness direction, the diffraction efficiency of the liquid crystal layer 36b (liquid crystal diffraction element) can increase.

Figure 12:
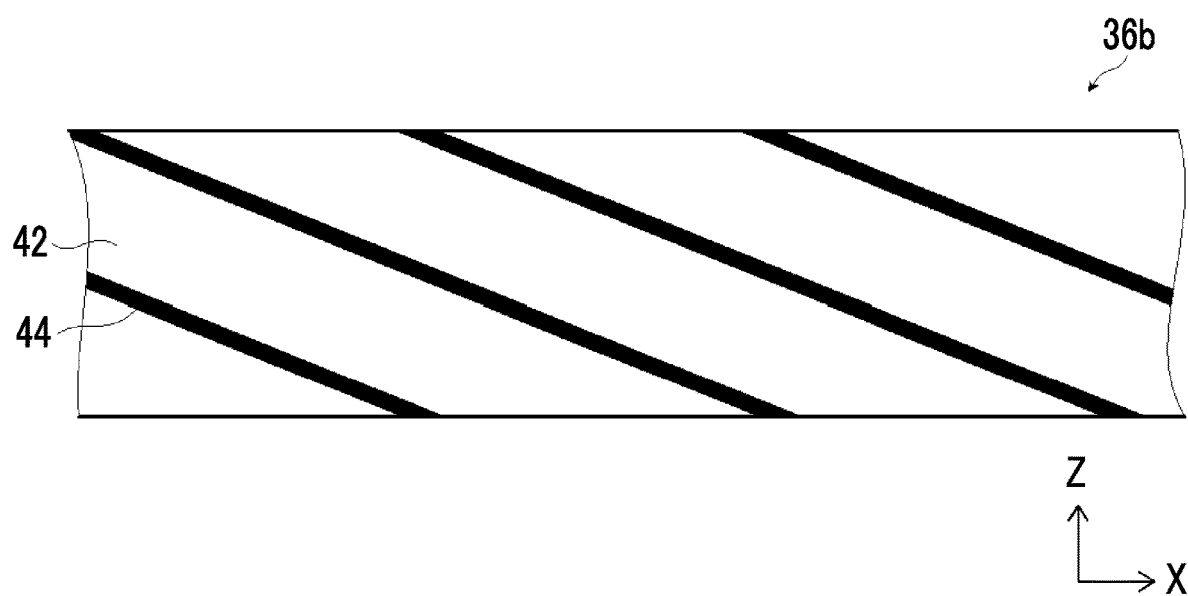
FIG. 12 is a diagram conceptually showing a cross sectional scanning electron microscope (SEM) image of the liquid crystal diffraction element shown in FIG. 11.

In a case where an X-Z plane shown in FIG. 11 obtained by cutting the liquid crystal layer 36b in which the liquid crystal compound is twisted and aligned in the thickness direction in the arrangement axis D direction is observed with a scanning electron microscope (SEM), a stripe pattern in which a plurality of pairs of bright lines 42 and dark lines 44 shown in FIG. 12 are arranged in the arrangement axis D direction (one in-plane direction) and are tilted with respect to a normal line of an interface of the liquid crystal layer is observed.

In addition, in the present invention, it is preferable that two or more liquid crystal diffraction elements (liquid crystal layers) are provided and in at least two of the liquid crystal diffraction elements, a region where the direction of the optical axis of the liquid crystal compound is twisted and rotates in a thickness direction is provided and directions that are twisted and rotate in the thickness direction are different from each other.

Figure 13:
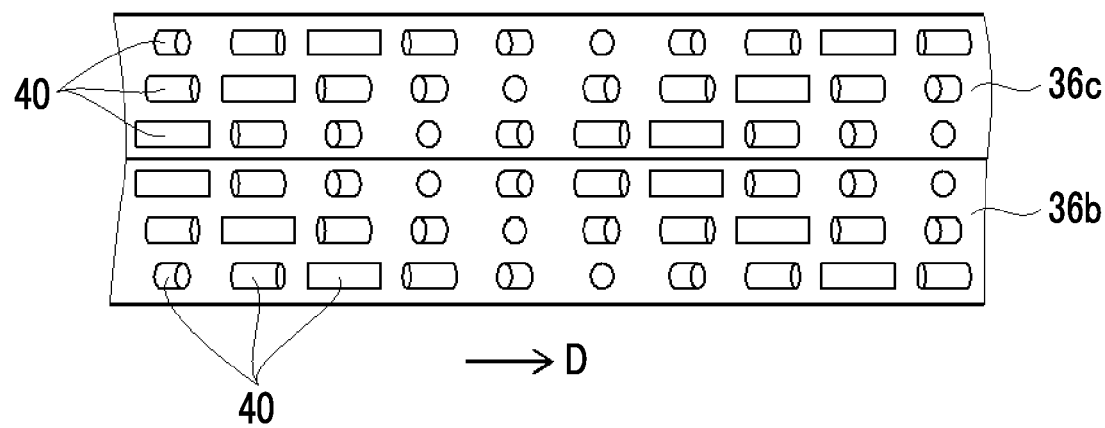
FIG. 13 is a diagram showing still another example of a liquid crystal diffraction element in the spectral detection device according to the present invention.

FIG. 13 conceptually shows another example of the liquid crystal diffraction element (liquid crystal layer) in the hyperspectral sensor according to the embodiment of the present invention.

In the example shown in FIG. 13, two liquid crystal layers including the liquid crystal layer 36b and a liquid crystal layer 36c are provided.

The liquid crystal layer 36b is a layer in which the liquid crystal compound 40 is aligned in a liquid crystal alignment pattern in which a direction of an optical axis changes while continuously rotating in at least one in-plane direction. In addition, the liquid crystal layer 36c is a layer in which the liquid crystal compound 40 is aligned in a liquid crystal alignment pattern in which a direction of an optical axis changes while continuously rotating in at least one in-plane direction. The arrangement axis D in the liquid crystal layer 36b is parallel to the arrangement axis D in the liquid crystal layer 36c, the rotation direction of the optical axis in the liquid crystal alignment pattern of the liquid crystal layer 36b is the same as the rotation direction of the optical axis in the liquid crystal alignment pattern of the liquid crystal layer 36c, and the length of the single period of the liquid crystal alignment pattern of the liquid crystal layer 36b is the same as the length of the single period of the liquid crystal alignment pattern of the liquid crystal layer 36c.

In addition, as shown in FIG. 13, in the liquid crystal layer 36c, the liquid crystal compound 40 is aligned to be twisted clockwise (to the right) from the upper side to the lower side in the drawing in the thickness direction.

On the other hand, in the liquid crystal layer 36b, the liquid crystal compound 40 is aligned to be twisted counterclockwise (to the left) from the upper side to the lower side in the drawing in the thickness direction.

That is, in the example shown in FIG. 13, in the liquid crystal layer 36b and the liquid crystal layer 36c, the in-plane liquid crystal alignment patterns are the same, and the twisted states of the liquid crystal compound 40 in the thickness direction are different from each other.

This way, by providing the liquid crystal layers in which the twisted states of the liquid crystal compound 40 in the thickness direction are different from each other, even in a case where the diffraction angle of the liquid crystal diffraction element (liquid crystal layer) is large, a decrease in diffraction efficiency can be suppressed. In addition, a high diffraction efficiency can be maintained even for incidence light components having different wavelengths.

Figure 14:
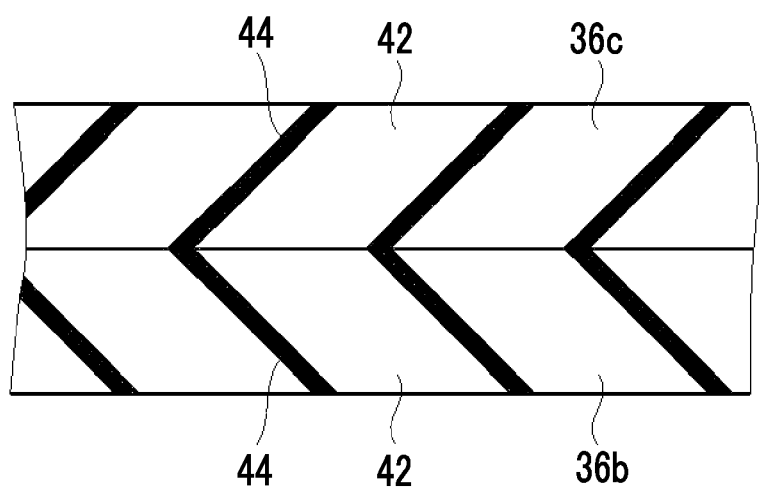
FIG. 14 is a diagram conceptually showing a cross sectional scanning electron microscope (SEM) image of the liquid crystal diffraction element shown in FIG. 13.

In a case where X-Z planes shown in FIG. 13 obtained by cutting the liquid crystal layer 36b and the liquid crystal layer 36c in which the liquid crystal compound is twisted and aligned in the thickness direction in the arrangement axis D direction are observed with a scanning electron microscope (SEM), as shown in FIG. 14, in the liquid crystal layer 36b and the liquid crystal layer 36c, directions in which the plurality of pairs of the bright lines 42 and the dark lines 44 arranged in the arrangement axis D direction (one in-plane direction) are tilted with respect to the normal line of the interface of the liquid crystal layer are different from each other.

<Sensor Array>

The sensor array 18 receives each of the light components in the wavelength ranges split by the spectrophotometer (spectral optical element), photoelectrically converts the brightness and darkness of the light into the amount of charge, and outputs the amount of charge as an electrical signal. The sensor array 18 is not particularly limited. For example, a complementary metal oxide semiconductor (CMOS) sensor or a charge coupled device (CCD) sensor can be used.

As the sensor array 18, a line sensor that detects light in a line shape or an area sensor that two-dimensionally detects light is preferable, and an area sensor is more preferable.

<Retardation Layer>

As the spectral detection device according to the embodiment of the present invention, a spectral detection device including not only the members shown in the drawing but also a retardation layer (for example, a λ/4 plate) can be preferably used.

Figure 7:
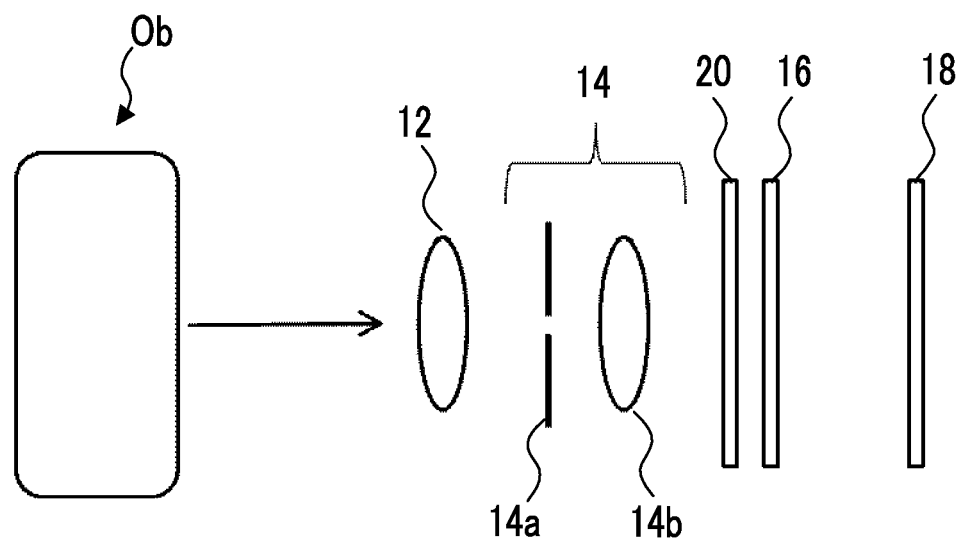
FIG. 7 is a diagram conceptually showing another example of the spectral detection device according to the present invention.

FIG. 7 conceptually shows another example of a spectral detection device 10b according to the embodiment of the present invention further including a retardation layer 20.

In the spectral detection device 10b shown in FIG. 7, the retardation layer 20 is provided on a side of the spectral optical element 16 opposite to the sensor array 18. That is, in the example shown in FIG. 7, the retardation layer 20 is disposed between the light-collimating optical element 14 and the spectral optical element 16.

The retardation layer 20 is not particularly limited and may be appropriately selected depending on the optical anisotropy of the polarization diffraction element. An λ/4 plate is preferable. In this case, a linearly polarized light component is converted into circularly polarized light. Therefore, the diffraction direction can change depending on whether light diffracted by the polarization diffraction element is a P polarized light component or a S polarized light component from the subject, and the reflection component as disturbance can be removed using the spectral data received by the sensor array 18 (for example, in a case where different polarized light components are received by an upper half and a lower half of the sensor array 18 of FIG. 7).

As the retardation layer 20, a well-known retardation layer can be used. For example, various well-known retardation plates, for example, a cured layer or a structural birefringent layer of a polymer or a liquid crystal compound can be used.

As the retardation layer 20, a retardation layer in which a plurality of retardation plates are laminated to effectively exhibit a desired action is also preferable. As a λ/4 plate, a retardation layer in which a plurality of retardation plates are laminated to effectively function as a λ/4 plate is also preferably used. For example, a broadband λ/4 plate described in WO2013/137464A in which a λ/2 plate and a λ/4 plate are used in combination can handle with incidence light in a wide wavelength range and can be preferably used.

Further, it is preferable that the retardation layer 20 has reverse wavelength dispersibility. In a case where the retardation layer 20 has reverse wavelength dispersibility, incidence light in a wide wavelength range can be handled.

In addition, the retardation layer 20 is a patterned retardation layer in which a direction of an in-plane slow axis varies. As a result, the number of polarization directions that can be detected can increase.

<Focus Optical Element>

As the spectral detection device according to the embodiment of the present invention, a spectral detection device including not only the members shown in the drawing but also a focus optical element (for example, a lens element) can be preferably used.

Figure 8:
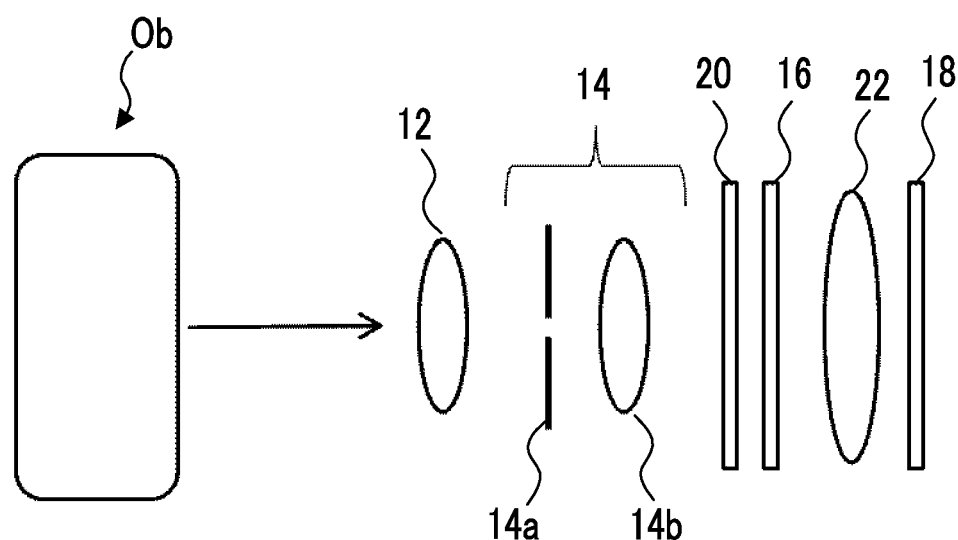
FIG. 8 is a diagram conceptually showing still another example of the spectral detection device according to the present invention.

FIG. 8 conceptually shows another example of a spectral detection device 10c according to the embodiment of the present invention further including a focus optical element 22.

In the spectral detection device 10b shown in FIG. 7, the focus optical element 22 is provided between the spectral optical element 16 and the sensor array 18.

The focus optical element 22 is not particularly limited. A well-known element can be used as the focus optical element 22 as long as it has the same function.

The focus optical element 22 is an optical element having a function of focusing light from the spectral optical element 16, that is, the polarization diffraction element on the sensor array 18. The focus optical element 22 is not particularly limited. For example, various optical elements such as a lens element, a prism element, or a spatial light modulation element can be used depending on purposes.

A method of acquiring a two-dimensional image using the spectral detection device according to the embodiment of the present invention is not particularly limited, and various methods can be used.

Examples of the method of acquiring a two-dimensional image using the spectral detection device according to the embodiment of the present invention include a method of moving the subject in a time series, a method of acquiring a two-dimensional image by mechanically moving a slit or the spectral detection device itself, a method using a variable slit in which light is transmitted and blocked by liquid crystal depending on application of a voltage such that a slit is formed and the position of the slit moves electrically, and a method of acquiring a two-dimensional image using a scanning mechanism including a microelectro mechanical system (MEMS) described in JP2015-075352A.

In the spectral detection device according to the embodiment of the present invention, in order to remove the influence of ambient light to acquire an accurate light intensity of a subject, a spectral detection device including a light source for removing ambient light can be preferably used.

The light source for removing ambient light is not particularly limited, and a well-known light source can be used. For example, a spectrally continuous light source described in JP2015-075352A can be preferably used.

Hereinabove, the optical element and the spectral detection device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Liquid Crystal Diffraction Element>

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| The following material for photo-alignment | . . . | 1.00 part by mass |
| Water | . . . | 16.00 parts by mass |
| Butoxyethanol | . . . | 42.00 parts by mass |
| Propylene glycol monomethyl ether | . . . | 42.00 parts by mass |

—Material for Photo-Alignment—

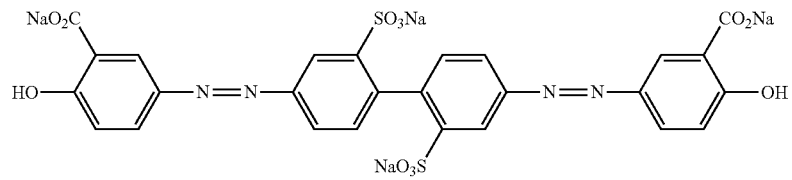

(Exposure of Alignment Film)

The alignment film was exposed using the exposure device shown in FIG. 6 to form an alignment film P-1 having an alignment pattern.

In the exposure device, a laser that emits laser light having a wavelength (325 nm) was used as the laser. The exposure amount of the interference light was 600 mJ/cm². The single period (the length over which the optical axis rotates by 180°) of an alignment pattern formed by interference of two laser beams was controlled by changing an intersecting angle (intersecting angle α) between the two beams.

(Formation of Liquid Crystal Layer)

In Example 1, an optical element including two liquid crystal layers was prepared, in which the first liquid crystal layer was a tilted optically-anisotropic layer in which bright and dark lines were tilted with respect to a normal line of an interface in a cross-sectional SEM image, the second liquid crystal layer was a tilted optically-anisotropic layer in which bright and dark lines were tilted with respect to a normal line of an interface in a cross-sectional SEM image, and directions in which the bright and dark lines were tilted in the first liquid crystal layer and the second liquid crystal layer were different.

(Formation of First Liquid Crystal Layer)

As the liquid crystal composition forming the liquid crystal diffraction element, the following composition A-1 was prepared.

Composition A-1

| | | |
|---|---|---|
| Rod-Like liquid crystal compound L-1 | ... | 100.00 parts by mass |
| Polymerization initiator (IRGACURE (registered trade name) 907, manufactured by BASF SE) | ... | 3.00 parts by mass |
| Photosensitizer (KAYACURE DETX-S, manufactured by Nippon Kayaku Co., Ltd.) | ... | 1.00 part by mass |
| Chiral agent Ch-1 | ... | 0.20 parts by mass |
| Leveling agent T-1 | ... | 0.08 parts by mass |
| Methyl ethyl ketone | ... | 1200.00 parts by mass | by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above.

Regarding the first liquid crystal layer, the following composition A-1 was applied to the alignment film P-1 to form a coating film, the coating film was heated using a hot plate at 80° C., and the coating film was irradiated with ultraviolet light having a wavelength of 365 nm at an irradiation dose of 300 mJ/cm² using a high-pressure mercury lamp in a nitrogen atmosphere. As a result, the alignment of the liquid crystal compound was immobilized.

Regarding the second or subsequent liquid crystal layer, the composition was applied to the first liquid crystal layer,

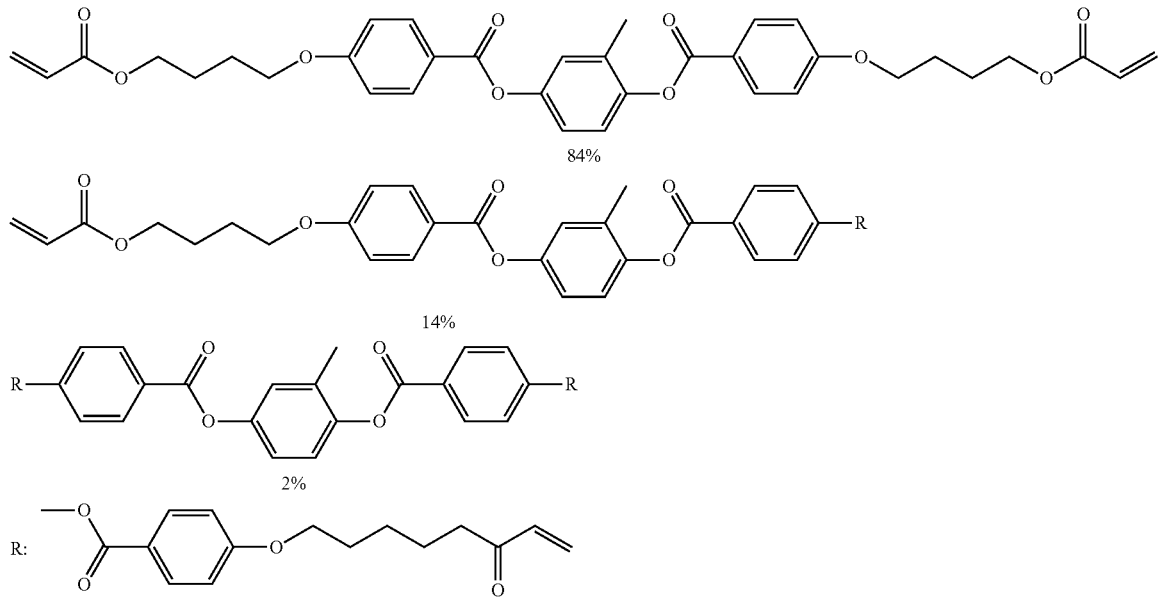

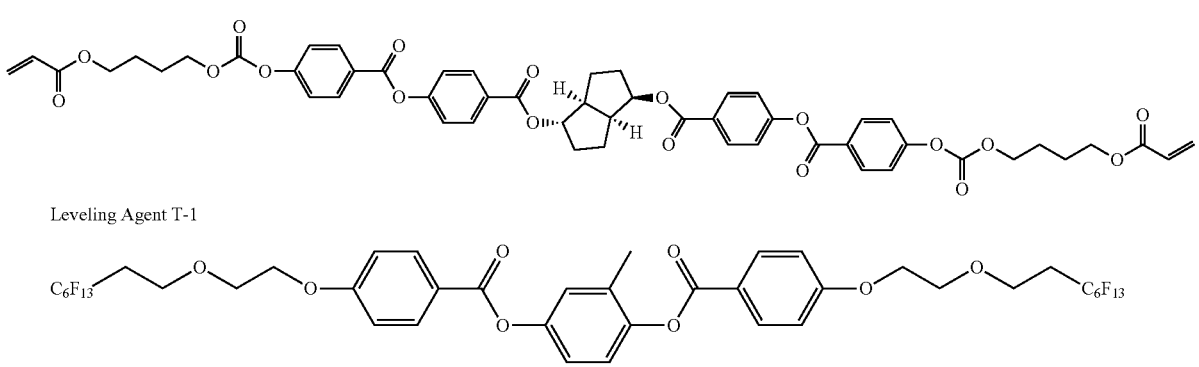

The first liquid crystal layer was formed by applying multiple layers of the composition A-1 to the alignment film P-1. The following processes were repeated, the processes including: preparing a first liquid crystal immobilized layer and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, and the first liquid crystal layer was formed.

A complex refractive index Δn of the cured layer of a liquid crystal composition A1 was obtained by applying the liquid crystal composition A1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation Re(λ) and the thickness of the liquid crystal immobilized layer. $\Delta n_\lambda$ can be calculated by dividing the retardation Re(λ) by the thickness. The retardation Re(λ) was measured at a desired wavelength using a spectroscopic ellipsometer (manufactured by J. A. Woollam Co., Ltd.), and the thickness was measured using a SEM. In the expression of Re(λ), λ represents the wavelength of incidence light. In the following description, the wavelength λ of incidence light was 550 nm.

Finally, in the first liquid crystal layer, $\Delta n_{550} \times$ thickness=Re(550) of the liquid crystals was 275 nm, and it was verified using a polarization microscope that periodic alignment occurred on the surface as shown in FIG. 3. The periodically aligned surface refers to an in-plane alignment pattern in which the horizontal rotation alignment axis was arranged in the one in-plane direction. In the horizontal rotation alignment pattern of the first liquid crystal layer, the single period was 3.0 μm. In addition, the twisted angle of the first optically-anisotropic layer in the thickness direction was 80°. Hereinafter, unless specified otherwise, "$\Delta n_{550} \times$ thickness" and the like were measured as described above. In addition, in the cross sectional image with a SEM, a state where the bright and dark lines were obliquely tilted with respect to the normal line of the lower interface (interface with the glass substrate) of the liquid crystal layer was observed.

(Formation of Second Liquid Crystal Layer)

As the liquid crystal composition forming the liquid crystal layer, the following composition A-2 was prepared.

Composition A-2

| Rod-Like liquid crystal compound L-1 | ... | 100.00 parts by mass |
|---|---|---|
| Polymerization initiator (IRGACURE (registered trade name) 907, manufactured by BASF SE) | ... | 3.00 parts by mass |
| Photosensitizer (KAYACURE DETX-S, manufactured by Nippon Kayaku Co., Ltd.) | ... | 1.00 part by mass |
| Chiral agent Ch-2 | ... | 0.34 parts by mass |
| Leveling agent T-1 | ... | 0.08 parts by mass |
| Methyl ethyl ketone | ... | 1200.00 parts by mass |

The second liquid crystal layer was formed on the first liquid crystal layer using the same method as described above, except that the composition A-2 was used, and an optical element according to Example 1 was prepared.

Finally, in the second liquid crystal layer, $\Delta n_{550} \times$ thickness=Re(550) of the liquid crystals was 275 nm, and it was verified using a polarization microscope that periodic alignment occurred on the surface as shown in FIG. 3. In the liquid crystal alignment pattern of the second liquid crystal layer, the single period was 3.0 μm.

In addition, the twisted angle of the first liquid crystal layer in the thickness direction was 80° of the right twisting. The twisted angle of the second liquid crystal layer in the thickness direction was 80° of the left twisting. The twisted directions of the first liquid crystal layer and the second liquid crystal layer were opposite to each other. In addition, in the cross sectional images of the first liquid crystal layer and the second liquid crystal layer with a SEM, a state where the bright and dark lines were obliquely tilted with respect to the normal line of the lower interface of the optically-anisotropic layer was observed. Further, in the first liquid crystal layer and the second liquid crystal layer, the directions in which the bright and dark lines were tilted with respect to the normal line were opposite to each other.

(Preparation of Retardation Layer)

(Formation of Alignment Film)

The following coating liquid for forming an alignment film was applied to the support of the glass substrate. The support on which the coating film of the coating liquid for forming an alignment film was formed was dried using a hot plate at 60° C. for 60 seconds. As a result, an alignment film was formed.

(Exposure of Alignment Film)

By irradiating the obtained alignment film P-2 with polarized ultraviolet light (50 mJ/cm², using an extra high pressure mercury lamp), the alignment film was exposed.

(Formation of Retardation Layer)

As the liquid crystal composition forming the retardation layer, the following composition R-1 was prepared.

Composition R-1

| Liquid crystal compound L-2 | ... | 42.00 parts by mass |
|---|---|---|
| Liquid crystal compound L-3 | ... | 42.00 parts by mass |
| Liquid crystal compound L-4 | ... | 16.00 parts by mass |
| Polymerization initiator PI-1 | ... | 0.50 parts by mass |
| Leveling agent G-1 | ... | 0.20 parts by mass |
| Methyl ethyl ketone | ... | 176.00 parts by mass |
| Cyclopentanone | ... | 44.00 parts by mass |

Chiral agent Ch-2

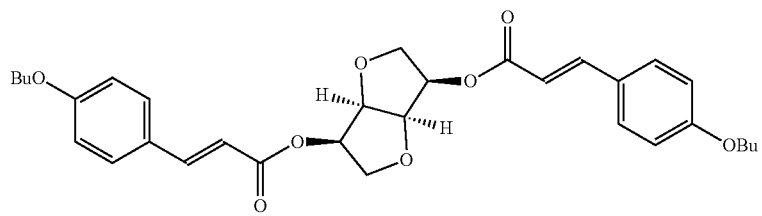

-Liquid Crystal Compound L-2-

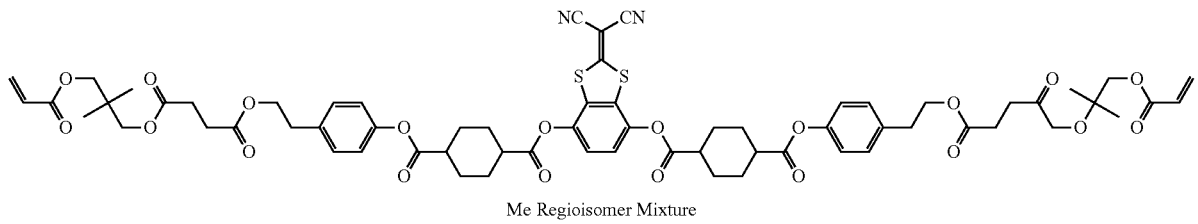

Me Regioisomer Mixture

-Liquid Crystal Compound L-3-

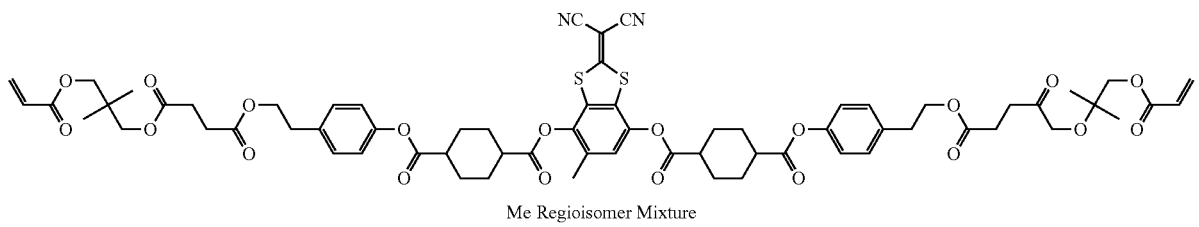

Me Regioisomer Mixture

-Liquid Crystal Compound L-4-

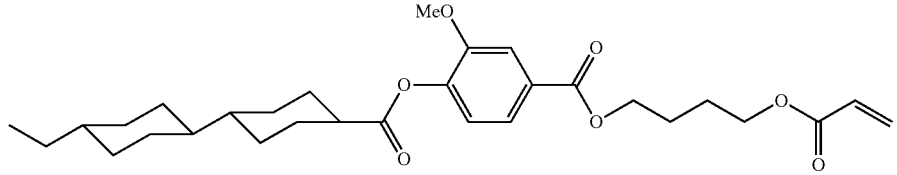

-Polymerization initiator PI-1-

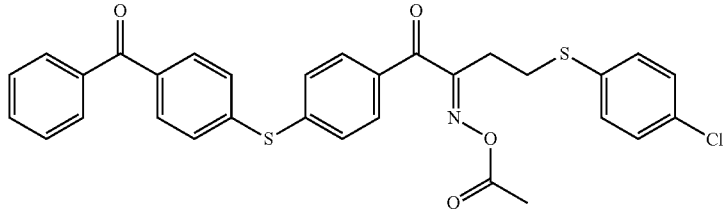

-Leveling Agent G-1-

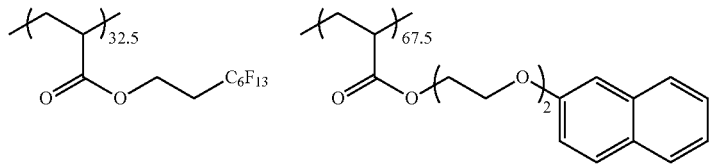

As the retardation layer, a liquid crystal layer formed of a reverse dispersion liquid crystal compound was formed.

The liquid crystal layer as the retardation layer was formed by applying the above-described composition R-1 to the alignment film P-2. The applied coating film was heated using a hot plate at 70° C., the coating film was cooled to 65° C., and the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized.

As a result, a horizontally aligned liquid crystal layer was obtained. Re(550) of the obtained retardation layer was 138 nm.

<Preparation of Spectral Detection Device>

The spectral detection device shown in FIG. 7 was prepared.

A lens element was prepared as the light-propagating optical element, a slit and a lens element were prepared as the light-collimating optical element, and a CMOS sensor was prepared as the sensor array. The prepared liquid crystal diffraction element was used as the spectral optical element, that is, the polarization diffraction element, and the prepared retardation layer was used as the retardation layer. By disposing the optical elements in the order shown in FIG. 7, a spectral detection device was formed.

[Evaluation]

Regarding the prepared spectral detection device, the detection accuracy of spectral data of a subject was evaluated using the following method.

Figure 9:
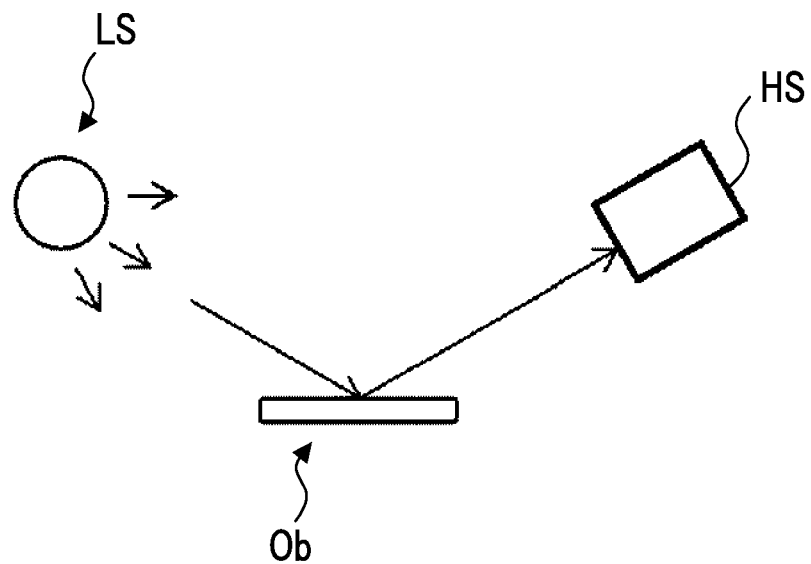
FIG. 9 is a diagram conceptually showing an example of an evaluation system of the spectral detection device according to the present invention.

In an evaluation system shown in FIG. 9, the spectral detection device was evaluated. A white LED was used as a light source LS, and cloth (orange) was used as the subject Ob.

The spectral detection device HS was disposed to acquire reflected light from the subject in a direction tilted at 60° with respect to the normal direction of the main surface of the subject, and spectral data was acquired.

Next, a transparent acrylic plate as a reflecting material that was disturbance was disposed on the subject Ob, and spectral data of the reflected light from the subject Ob was acquired using the same method as described above in the spectral detection device HS.

Spectral data of the subject Ob before and after disposing the acrylic plate were compared to each other. In this case, in a case where polarized light of reflected light from the subject Ob was not separated (during the synthesis of spectral data of a S polarized light component and a P polarized light component), spectral data detected by the subject Ob before and after disposing the acrylic plate were largely different from each other. On the other hand, in a case where polarized light of reflected light from the subject Ob was separated (during the synthesis of spectral data after removing a S polarized light component), spectral data detected by the subject Ob before and after disposing the acrylic plate substantially matched each other. Accordingly, it can be seen that, in a case where spectral data is obtained after separating polarized light using the polarization diffraction element, the information of the subject Ob in which the influence of disturbance of the reflecting material is reduced can be obtained.

As can be seen from the above results, the effects of the present invention are obvious.

The present invention is suitably applicable to a hyperspectral camera where high visibility performance is required.

EXPLANATION OF REFERENCES 10, 10b to 10c: spectral detection device (hyperspectral sensor)
12: light-propagating optical element
14: light-collimating optical element
14a: slit member
14b: lens element
16: spectral optical element (polarization diffraction element)
18: sensor array
20: retardation layer
22: focus optical element
30: support
32: alignment film
36: liquid crystal layer
40: liquid crystal compound
40A: optical axis
42: bright portion
44: dark portion
60: exposure device
62: laser
64: light source
65: $\lambda/2$ plate
68: polarization beam splitter
70a, 70B: mirror
72A, 72B: $\lambda/4$ plate
M: laser light
MA, MB: beam
$P_O$: linearly polarized light
$P_R$: right circularly polarized light
$P_L$: left circularly polarized light
$L_1$, $L_4$: incidence light
$L_2$, $L_5$: transmitted light
D: arrangement axis
$\Lambda$: single period (period of diffraction structure)
Ob: subject
LS: light source
HS: hyperspectral sensor

What is claimed is:

1. A hyperspectral sensor in which light from a subject is split into light components in a plurality of wavelength ranges by a spectral optical element and each of the light components in the wavelength ranges is received by a sensor array consisting of a plurality of photodetection elements to acquire spectral data in which spectral information of the subject is associated with each of the photodetection elements,
   wherein the spectral optical element is a polarization diffraction element for converting incident light into polarized light,
   a light-collimating optical element that collimates transmitted light and causes the collimated light to be incident into the polarization diffraction element is provided, and
   the light-collimating optical element includes a slit.

2. The hyperspectral sensor according to claim 1,
   wherein the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

3. A hyperspectral sensor in which light from a subject is split into light components in a plurality of wavelength ranges by a spectral optical element and each of the light components in the wavelength ranges is received by a sensor array consisting of a plurality of photodetection elements to acquire spectral data in which spectral information of the subject is associated with each of the photodetection elements,
   wherein the spectral optical element is a polarization diffraction element for converting incident light into polarized light,
   a light-collimating optical element that collimates transmitted light and causes the collimated light to be incident into the polarization diffraction element is provided, and
   wherein the light-collimating optical element includes a unit in which a slit and a lens element are combined.

4. A hyperspectral sensor in which light from a subject is split into light components in a plurality of wavelength ranges by a spectral optical element and each of the light components in the wavelength ranges is received by a sensor array consisting of a plurality of photodetection elements to acquire spectral data in which spectral information of the subject is associated with each of the photodetection elements,
   wherein the spectral optical element is a polarization diffraction element for converting incident light into polarized light,
   a light-collimating optical element that collimates transmitted light and causes the collimated light to be incident into the polarization diffraction element is provided, and
   wherein the light-collimating optical element includes a lens array.

5. The hyperspectral sensor according to claim 1,
   wherein a retardation layer is provided on a side of the spectral optical element opposite to a side where the sensor array is provided.

6. The hyperspectral sensor according to claim 5,
   wherein the retardation layer is a ¼ wave plate.

7. The hyperspectral sensor according to claim 1,
   wherein a focus optical element is provided between the spectral optical element and the sensor array.

8. The hyperspectral sensor according to claim 2,
wherein the liquid crystal diffraction element has a region where the direction of the optical axis of the liquid crystal compound is twisted and rotates in a thickness direction.

9. The hyperspectral sensor according to claim 2,
wherein a plurality of the liquid crystal diffraction elements are provided, and
in at least two of the liquid crystal diffraction elements, a region where the direction of the optical axis of the liquid crystal compound is twisted and rotates in a thickness direction is provided and directions that are twisted and rotate in the thickness direction are different from each other.

10. A hyperspectral camera comprising:
the hyperspectral sensor according to claim 1,
wherein spectral data forming a two-dimensional image of the subject is acquired.

11. The hyperspectral sensor according to claim 2,
wherein a retardation layer is provided on a side of the spectral optical element opposite to a side where the sensor array is provided.

12. The hyperspectral sensor according to claim 11,
wherein the retardation layer is a ¼ wave plate.

* * * * *